United States Patent Office 2,800,247
Patented July 23, 1957

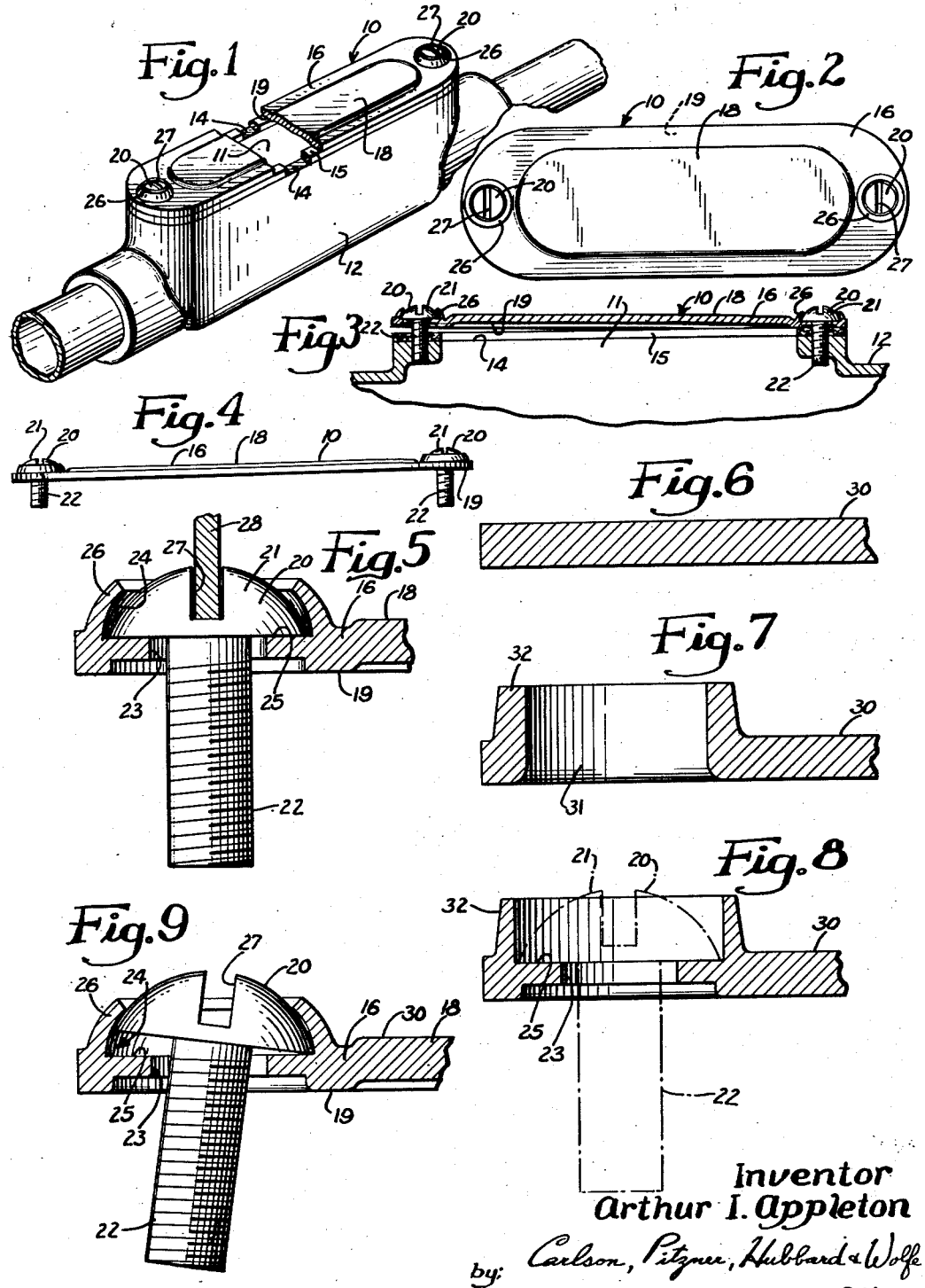

2,800,247

CLOSURE MEMBER

Arthur I. Appleton, Northbrook, Ill.

Application October 17, 1951, Serial No. 251,701

1 Claim. (Cl. 220—55)

The present invention relates in general to closure members for the access apertures of electrical and pipe fittings, machine housings, and the like. More specifically, the invention is concerned with a novel closure member finding particular, but by no means exclusive, utility as a cover for electrical conduit fittings. In another aspect, the present invention is concerned with a novel method of making such a closure member.

One object of the present invention is to provide a screw mounted closure member of the character set forth and capable of being readily secured in place without binding, regardless of whether one of the screws should be tightened in advance of the other.

Another object is to provide a closure member of the foregoing type and having a self-contained mounting means, eliminating the stocking and installation difficulties involved in instances where small, loose parts are used for mounting purposes.

Still another object is to provide a screw mounted closure member or fitting cover which possesses improved sealing and screw retaining characteristics.

A further object is to provide a novel and economical method for making closure members of the type described herein, such method lending itself to economical manufacture of the closure members on a mass production basis.

Other objects and advantages will become apparent as the following description proceeds, taken in connection with the accompanying drawings, in which:

Figure 1 is a perspective view of an electrical conduit fitting equipped with an illustrative closure member or cover embodying the present invention, an intermediate portion of the cover being broken away to show structural details.

Fig. 2 is an enlarged plan view of the cover shown in Fig. 1.

Fig. 3 is an enlarged vertical sectional view taken longitudinally through the conduit fitting and cover of Fig. 1.

Fig. 4 is a side elevation of the cover as shown in Fig. 2.

Fig. 5 is an enlarged fragmentary vertical sectional view detailing one of the mounting screws and the surrounding portion of the illustrative cover of Fig. 1.

Figs. 6, 7, 8 and 9 are enlarged fragmentary detail views illustrating sequentially certain steps involved in carrying out the method described herein.

While the invention is susceptible of various modifications and alternative constructions, a preferred embodiment and method have been illustrated in the drawing and will be described below in considerable detail. It should be understood, however, that these is no intention to limit the invention to the specific form described, but, on the contrary, the intention is to cover all modifications and alternative constructions falling within the spirit and scope of the invention as expressed in the appended claims.

Referring more specifically to the drawing, the invention is there exemplified in an illustrative closure member 10 adapted in the present instance to serve as a cover for the access opening 11 of an electrical conduit fitting 12. In this case the conduit fitting 12 happens to be of oblong, boxlike form, its side walls terminating in a flat outer face 14 which surrounds the access opening 11. The face 14 comprises a sealing surface for the cover 10 and, as shown in Fig. 1, may receive a suitable gasket 15 interposed between the cover 10 and the fitting 12.

In the form shown, the cover 10 comprises an elongate or oblong plate 16 of appropriate size to overlie completely the access opening 11 and the surrounding sealing surface 14. The central portion 18 of the plate 16 may be embossed or raised slightly out of the general plane of the plate, defining a peripheral sealing surface 19 on the underside of the plate comparable in shape and area to the sealing surface 14. The plate 16 is provided with a pair of mounting screws 20 each having a head 21 and a threaded shank 22. The screw shanks 22 project through corresponding holes 23 adjacent the longitudinal extremities of the plate and are adapted to engage respective tapped holes in the fitting 12.

Provision is made in the cover 10 for loosely but positively retaining the mounting screws 20 in their holes 23 so that each of the screws 20 is capable of limited universal movement in any direction about the axis of its respective hole 23. This is accomplished in a remarkably simple and effective manner by confining each screw head 21 within an individual swivel socket 24 having a seat 25 and a retainer 26. In this instance, the seat 25 of each socket is in the form of an annular shoulder integral with the plate 16 and surrounding the screw hole 23, while the retainer 26 is fashioned as an inwardly tapered annular bead also integral with the plate 16 and disposed in surrounding relation with the screw head 21 (see Fig. 5). The retainer or bead 26 tapers in a radially inward direction toward its projecting face, following generally the convex contour of its associated screw head 21 but having sufficient clearance with the latter to permit the limited universal movement just mentioned.

The foregoing arrangement not only permits the cover 10 and its mounting screws 20 to be handled and stocked as a single entity, but in addition, permits independent tightening of the mounting screws 20. Thus as the cover 10 is placed in position over the access aperture 11 with each screw 20 barely engaging the tapped hole in the fitting 12, it is possible to tighten one of the screws 20 completely before tightening the other screw. Moreover, there will be no binding when the other screw is tightened.

In accordance with another aspect of the invention, each annular bead 26 is so proportioned that it will overlap the screwdriver slot 27 of each mounting screw to some extent, as indicated in Fig. 5. By reason of such structural relation, the retainer or bead 26 forms an efficient keeper for the screwdriver slot 27 of its associated mounting screw, effectively preventing slipping of the screwdriver blade 28 out of the slot 27 as the mounting screw is being turned.

Having described the structural aspects of the fitting cover 10, consideration may next be given to the novel method of making such cover and which also embodies the invention. While the method readily lends itself to being carried out in a progressive die, it may with equal facility be performed with a wide variety of other tools and implements. Referring to Fig. 6, there is shown one end of a cover blank 30 in the form of a flat plate of sheet metal. The first step in the method comprises punching or striking a relatively large hole 31 near each end of the cover, causing some of the metal to flare out of the plane of the blank 30 in the direction of the punch movement. This produces a heavy annular wall or bead 32 on one side of the cover surrounding the punched hole 31 and projecting out of the plane of the cover, as indicated in Fig. 7. The next step comprises taking a punch of slightly larger diameter than the hole 31 but of smaller diameter than the outer diameter of the wall 32 and bringing such punch down against the projecting edge of the annular wall 32. The punch is moved a sufficient distance axially of the hole 31 to shear metal from the inner peripheral portion of the annular bead 32, causing the sheared metal to flow in a radially inward direction and to define the annular seat 25 for the mounting screw head. The seat is defined with a clearance hole 23 for the screw shank and which is of smaller diameter than the original hole 31. The next step involves dropping a mounting screw 20 into place on the seat 25 and forcing the remaining portion of the bead 32 radially inwardly to define annular retainer 26 for the head portion 21 of the screw. This is done by the simple expedient of striking the bead 32 with an annular punch of the desired contour. Such action thereupon confines each screw head to overlying relation with its seat but leaves sufficient clearance to permit the desired degree of limited swivel movement of the mounting screw. The remaining steps required to complete the cover and give it the form shown in Figs. 1 to 5 may be performed at this point or may be performed in advance of the foregoing steps. These remaining steps are, of course, forming the perimeter of the cover to the desired contour and embossing or raising the central portion 18 of the cover as indicated in Figs. 3 and 4.

I claim as my invention:

A closure member for the access apertures of conduit fittings, machine housings, and the like, said member comprising, in combination, a cover plate having a pair of spaced apart screw apertures therein, a pair of headed clamping screws having shanks adapted for a loose fit through said screw apertures, a pair of sockets fixed to said cover plate in surrounding relation with respective ones of said screw apertures, each said socket having an annular retainer also surrounding said screw aperture and overlying a peripheral portion of the screw head in loose relation thereto to permit limited universal movement of the screw whereby one of said clamping screws can be tightened in advance of the other screw without causing said other screw to bind.

References Cited in the file of this patent

UNITED STATES PATENTS

| | | |
|---|---|---|
| 832,595 | Cook | Oct. 9, 1906 |
| 1,788,408 | Raybould | Jan. 13, 1931 |
| 1,827,884 | Ellison | Oct. 20, 1931 |
| 2,183,641 | Double | Dec. 19, 1939 |
| 2,272,178 | McDowell et al. | Feb. 10, 1942 |
| 2,498,135 | Rock, Jr. | Feb. 21, 1950 |